F. J. Seymour,
Twine Holder,
Nº 63,950. Patented Apr. 16, 1867.

Witnesses:
Geo. D. Walker
Chas. H. Smith

Inventor:
Fred'k. J. Seymour

United States Patent Office.

FREDERICK J. SEYMOUR, OF WOLCOTTVILLE, CONNECTICUT.

Letters Patent No. 63,950, dated April 16, 1867.

IMPROVED TWINE-HOLDER.

*The Schedule referred to in these Letters Patent and making part of the same.*

TO ALL WHOM IT MAY CONCERN:

Be it known that I, FREDERICK J. SEYMOUR, of Wolcottville, in the county of Litchfield, and State of Connecticut, have invented, made, and applied to use, a certain new and useful Improvement in Twine-Holders; and I do hereby declare the following to be a full, clear, and exact description of the said invention, reference being had to the annexed drawing, making part of this specification, wherein—

Similar letters denote the same parts.

Twine-holders and reels have heretofore been placed in an elevated position, so that the twine could be pulled off as required for use. In these, however, difficulty often arose from the twine unwinding in consequence of its own weight hanging from the reel or holder.

My twine-holder is formed of two parts, hinged together and provided with a suspending ring or eye, so that the ball of twine can be placed in the holder with facility, and I employ a friction-brake applied to the twine to prevent its running out by its own weight.

Figure 1:
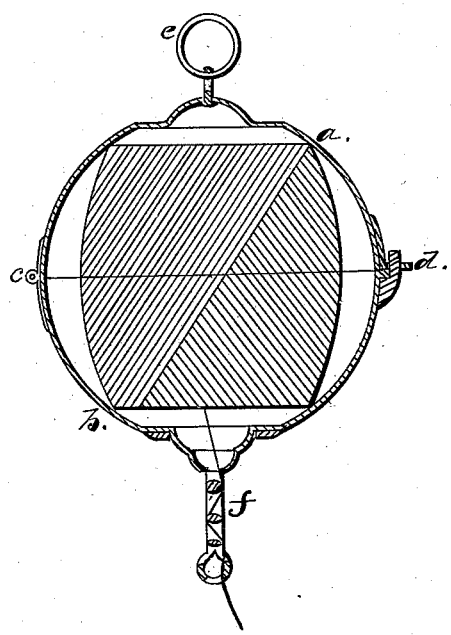
Figure 1 is a vertical section of said twine-holder.
Figure 2:
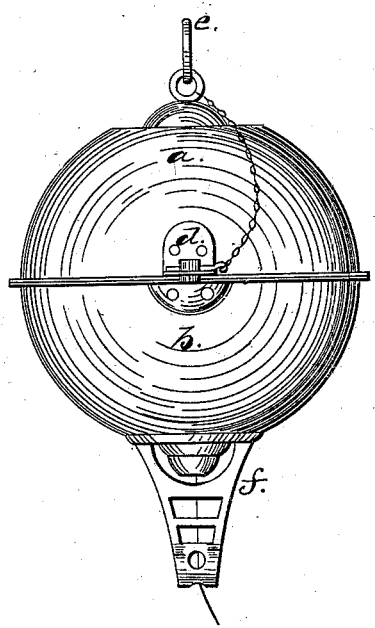
Figure 2 is an elevation of the same.

In the drawing, $a$ is the upper section of the twine-holder case, and $b$ the lower section; $c$ is the hinge for connecting them together; $d$ is the hasp, and pin by which the parts of the case are retained when closed upon the ball of twine; $e$ is the suspending ring or eye-hook. The lower part of the twine-holder is formed with an opening for the string to pass out, and $f$ is the brake for the twine, formed as a plate with slots, as seen in fig. 2, for the twine to be laced back and forth through these slots, and thereby produce the necessary friction to prevent the twine running out by its own weight, at the same time the twine will draw off freely when pulled upon, and the slots in the brake will allow a knot to pass.

What I claim, and desire to secure by Letters Patent, is—

A twine-holder formed of a metallic case fitted so as to be suspended, and provided with a brake to prevent the cord or twine running out by its own weight, as specified.

Dated December 22, 1866.

FRED'K J. SEYMOUR.

Witnesses:
   GEO. D. WALKER,
   CHAS. H. SMITH.